United States Patent [19]

Omae et al.

[11] Patent Number: 4,574,638

[45] Date of Patent: Mar. 11, 1986

[54] DEVICE FOR DETECTING END-SHAPE OF STEEL TUBE

[75] Inventors: Yoshihiro Omae; Tsugio Sekii, both of Kobe, Japan

[73] Assignee: Mitsubishi Denki Kabushiki Kaisha, Tokyo, Japan

[21] Appl. No.: 551,059

[22] Filed: Nov. 14, 1983

[30] Foreign Application Priority Data

Nov. 30, 1982 [JP] Japan ................... 57-211616

[51] Int. Cl.[4] .......................................... G01M 29/00
[52] U.S. Cl. .............................................. 73/637
[58] Field of Search ............................................ 73/637

[56] References Cited

U.S. PATENT DOCUMENTS 3,955,425  5/1976  Corneau ................................ 73/637
4,289,033  9/1981  Prause et al. ......................... 73/637

OTHER PUBLICATIONS

CH-Firmenschrift: EX-Test 9, Zumbach, Electronic-Automatic, 1970, S.1.

Primary Examiner—Peter Chin
Attorney, Agent, or Firm—Oblon, Fisher, Spivak, McClelland & Maier

[57] ABSTRACT

A device for detecting an end-shape of a steel tube which includes in combination: a plurality of detectors disposed around the circumference of a steel tube to be carried forward by a forwarding mechanism; and a detector position changing mechanism provided on each of the detectors to cause the same to move back and forth in the diametrical direction of the steel tube, the detector position changing mechanism being rotatable around the steel tube.

4 Claims, 6 Drawing Figures

FIGURE 1 *PRIOR ART*
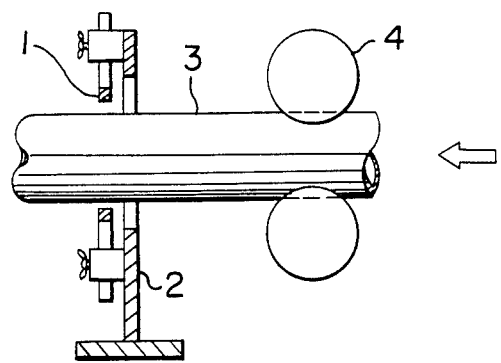
FIGURE 2 *PRIOR ART*
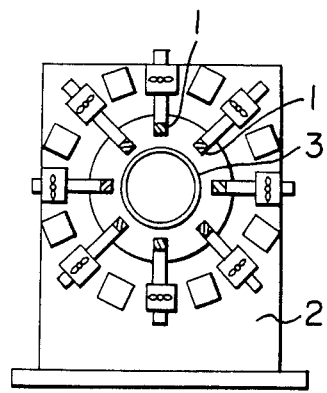

4,574,638

DEVICE FOR DETECTING END-SHAPE OF STEEL TUBE

BACKGROUND OF THE INVENTION

Field of the Invention

This invention relates to an improvement in a device for detecting an end-shape of a steel tube.

As this kind of the detecting device, there has been known one as shown in FIGS. 1 and 2 of the accompanying drawings. In these figures of the drawings, a reference numeral 1 denotes one of a plurality of detectors arranged around the circumference of the steel tube as an object of detection; a numeral 2 refers to a stand, on which the detectors 1 are to be mounted; a numeral 3 refers to a steel tube; and 4 denotes a pair of pinch rollers.

In such conventional end-shape detecting device for a steel tube, when the distal end of the steel tube 3 which has been carried forward in the direction on an arrow mark by means of the pinch rollers 4 enters the stand 2 having the detectors 1 mounted thereon, the end-shape of the steel tube is detected by the detectors 1, while the steel tube 3 is being carried forward. Thereafter, the end-shape of the steel tube 3 at the rear end thereof is detected in the same manner as mentioned.

In view of the conventional end-shape detecting device of the steel tube being in such a construction as mentioned above, there have existed with the device various disadvantages such that a large number of detectors 1 need to be provided around the circumference of the steel tube 3, that the number of the detectors 1 also needs to be changed depending on variations in the diameter of the steel tube, and further that the outer circumferential surface of the steel tube between the adjacent detectors of a certain established pitch cannot be detected, because the steel tube 3 and the detectors 1 do not revolve in any manner; and various other shortcomings.

SUMMARY OF THE INVENTION

The present invention has been made with a view to eliminating these disadvantages inherent in the conventional detecting device, and aims at providing such end-shape detecting device for a steel tube which is capable of eliminating a non-examined portion on the circumferential surface of the steel tube in its axial direction by making a fitting plate, on which the detectors are mounted, to be rotatable, and adjusting to changes in the diameter of the steel tube by providing a mechanism for changing the positions of the detectors.

According to the present invention, in general aspects of it, there is provided a device for detecting an end-shape of a steel tube which comprises in combination: a plurality of detectors disposed around the circumference of a steel tube to be carried forward by a forwarding means such as pinch rollers; and a detector position changing mechanism provided on each of said detectors to cause the same to move back and forth in the diametrical direction of the steel tube, said detector position changing mechanism being made rotatable around said steel tube.

The foregoing object, other objects as well as specific construction and operations of the end-shape detector for the steel tube according to the present invention will become more apparent and understandable from the following detailed description thereof when read in conjunction with the accompanying drawing, in which:

BRIEF DESCRIPTION OF THE DRAWING

FIGS. 1 and 2 illustrate a conventional device for detecting an end-shape of a steel tube, wherein FIG. 1 is a side elevational view, partly in cross-section, of the detector, and FIG. 2 is a front view thereof;

FIGS. 3 and 4 illustrate one preferred embodiment of the end-shape detecting device for steel tube according to the present invention, in which FIG. 3 is a side elevational view, partly in longitudinal cross-section, and FIG. 4 is a front view thereof.

DESCRIPTION OF THE PREFERRED EMBODIMENT

In the following discussion, the present invention will be described in detail with reference to one preferred embodiment thereof as illustrated in the accompanying drawing.

Figure 3:
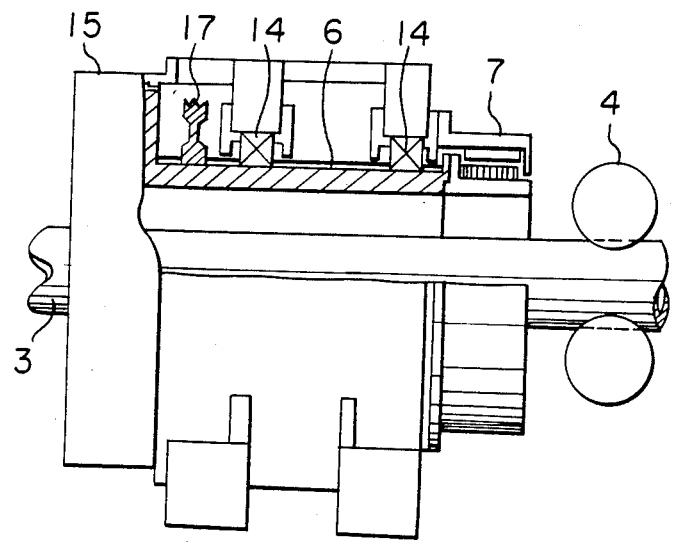
Figure 4:
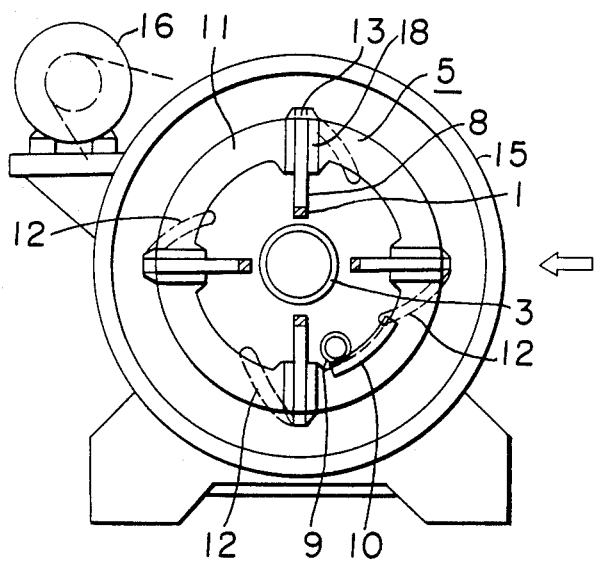

Referring to FIGS. 3 and 4 which illustrate the structure of the end-shape detecting device for steel tube according to the present invention, a reference numeral 1 designates four units of detectors which are disposed around the circumference of the steel tube at equally quartered positions therealong. Each detector is supported at the lowest end of a supporting rod 8 for it. A numeral 5 refers to a detector position changing mechanism which is constructed with supporting members 18, each slidably holding the supporting rod 8 thereon, an annular body 11 which rotates with the supporting members 18 being held on it, a rack 10 and a pinion 9 meshed each with other to rotate the annular body 11. A reference numeral 6 denotes a rotatory cylinder which is integrally constructed with the above-mentioned detector position changing mechanism 5, the mechanism being rotationally supported on a machine frame 15 by means of a bearing 14, and being rotated by an electric motor 16 through a pulley 17. A numeral 7 refers to a signal sending and receiving mechanism to perform exchange of signals between the detectors 1 and fixed parts. A numeral 12 refers to a slant groove formed on the surface of a flange which is provided on the rotatory cylinder 6 to the side of the above-mentioned detectors. A numeral 13 refers to a pin of the above-mentioned supporting rod 8, which is to be fitted into the slant groove 12. A numeral 3 refers to a steel tube; 4 denotes pinch rollers; and 19 a guide plate for the annular body 11.

The operations of the end-shape detector for steel tube according to the present invention will now be described hereinbelow. When the steel tube 3 is carried forward in an arrow direction by means of the pinch rollers, the rotatory cylinder 6 is rotated by the electric motor 16 around the steel tube 3 through the pulley 17, whereby the end-shape of the steel tube 3 can be detected through the detectors 1 mounted on the distal end of the supporting rod 8 in the detector position changing mechanism 5. Further, when the diameter of the steel tube 3 is changed, the pinion 9 in this detector position changing mechanism 5 is rotated. Since this pinion is pivotally supported on the flanged surface of the rotatory cylinder 6, it causes the annular body 11 to rotate through the rack 10, and to move up and down the supporting rod 8 to be engaged with the slant groove 12 through its pin 13, thereby changing the positions of the detectors 1 to meet the change in the size of the steel tube to be detected.

Figure 5:
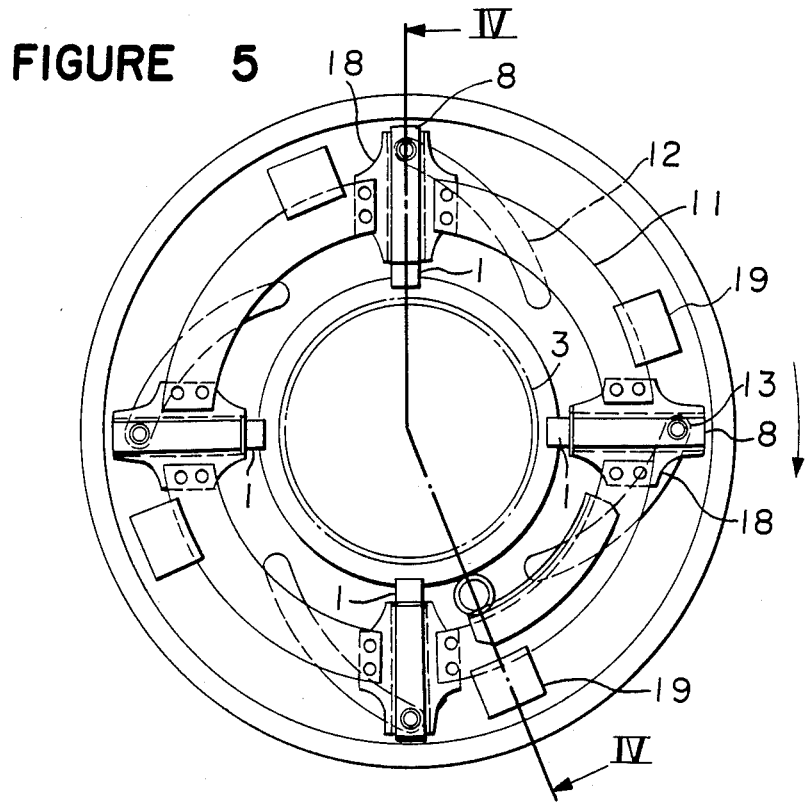
FIGS. 5 and 6 are respectively a front view and a cross sectional view taken along the line IV—IV, showing details of the rotary type detecting mechanism according to the present invention.
Figure 6:
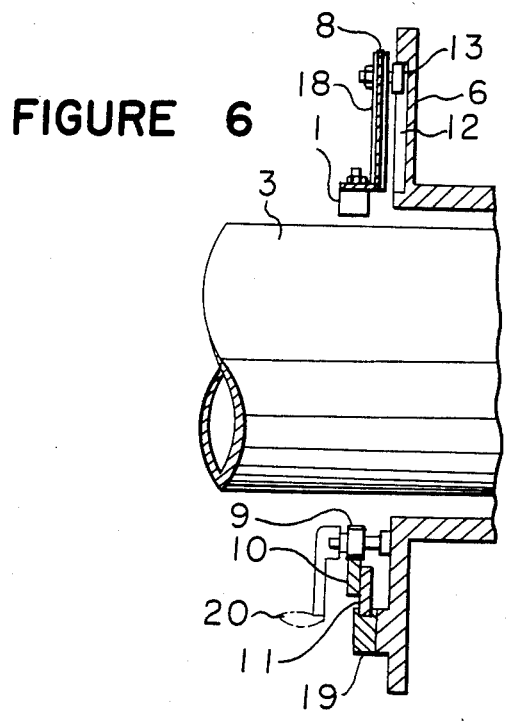

Referring now to FIGS. 5 and 6, the operating steps of the detector position changing mechanism 5 will be described in further detail, as follows.

When a handle 20 is rotated by hand, the pinion 9 causes the rack 10 to rotate and the annular body 11 is rotated thereby. Since there are disposed, on this annular body 11, the supporting rod 8 with the pin 13 being fitted thereon and the detector 1 mounted on the distal end position of the supporting rod 8, the movement of the pin 13 follows the locus of the slant groove 12 by the rotation of the annular body 11 with the result that the supporting rod 8 performs its rotation simultaneously with its up-and-down sliding motion. Since this slant groove 12 is of a curvature to enable the supporting rod to move up and down proportionately in correspondence to the diameter of the steel tube 3, graduations on a dial plate can be inscribed with an equal pitch.

It is to be noted that each of the detectors moves at the same time, and a gap between the detectors and the steel tube can be equally adjusted and maintained.

As mentioned in the foregoing, the detectors 1 scan the surface of the steel tube 3 in a spiral form owing to the straight forwarding of the steel tube 3 and simultaneous rotation of the detectors 1, whereby the occurrence of any non-examined portion on the circumferential surface of the steel tube in its axial direction can be perfectly eliminated.

Incidentally, the signal sending and receiving mechanism 7 for the detectors may be constructed by use of a slip ring or a non-contact type rotatory transformer, for example.

As stated in the foregoing, the end-shape detector according to the present invention is of such a construction that the detectors are caused to rotate on the circumferential surface of the steel tube, which contributes to reduction in the number of the detectors, makes it possible to perfectly eliminate the non-examined portion on the surface of the steel tube in its axial direction, and further enables the positions of the detectors to readily correspond to variations in the diameter of the steel tube by provision of the detector position changing mechanism.

Although, in the foregoing, the present invention has been described in specific details with reference to a preferred embodiment thereof, it should be understood that the embodiment is merely illustrative and not so limitative, and that any changes and modifications may be made by those persons skilled in the art within the spirit and scope of the present invention as set forth in the appended claims.

We claim:

1. A device for detecting an end-shape of a steel tube, comprising:
    a machine frame through which said steel tube is advanced;
    a rotary cylinder journaled to said machine frame and which includes a flange having a slant groove formed therein;
    bearing means interconnecting said machine frame and said rotary cylinder;
    means operatively associated with said rotary cylinder for rotating said rotary cylinder with respect to said machine frame;
    a plurality of detectors mounted on said machine frame so as to surround said steel tube upon being advanced through siad machine frame; and
    a detector position changing mechanism operatively associated with each of said detectors for moving said detectors inwardly and outwardly in a diametrical direction of said steel tube and which includes an annular body, support means mounted on said annular body for supporting each of said detectors and cooperating with said groove formed in said flange of said rotary cylinder, and means operatively associated with said annular body for rotating said annular body so as to cause selective movement of said detectors inward and outward, via said means for supporting each of said detectors, in said diametrical direction of said steel tube.

2. A device for detecting an end-shape of a steel tube as set forth in claim 1, wherein said means for supporting each of said detectors further comprises a support member mounted on said annular body, a support pin connected to said support member for supporting each of said detectors and a pin connected to said support member and fitted within said groove formed in said flange of said rotary cylinder.

3. A device for detecting an end-shape of a steel tube as set forth in claim 1, further comprising means for rotating said annular body.

4. A device for detecting an end-shape of a steel tube as set forth in claim 3, wherein said means for rotating said annular body further comprises a rack and pinion assembly.

* * * * *